U S006792894B1

(12) United States Patent
Donaldson

(10) Patent No.: US 6,792,894 B1
(45) Date of Patent: Sep. 21, 2004

(54) NON-CHOKING ANIMAL SHOULDER COLLAR WITH SEPARATION CONTROLLED HOOK AND LOOP CLOSURE

(76) Inventor: Elaine Johnson Donaldson, 1976 Sykes Creek Dr., Merritt Island, FL (US) 32953

( * ) Notice: Subject to any disclaimer, the term of this patent is extended or adjusted under 35 U.S.C. 154(b) by 0 days.

(21) Appl. No.: 10/392,505

(22) Filed: Mar. 20, 2003

(51) Int. Cl.[7] .............................................. A01K 27/00
(52) U.S. Cl. ........................ 119/856; 119/865; 119/863; 119/792; 54/19.1; 54/54
(58) Field of Search ................................. 119/850, 712, 119/856, 858, 818, 907, 865, 859, 863, 769, 770, 792, 802, 864; 54/19.1, 54

(56) References Cited

U.S. PATENT DOCUMENTS

| 146,770 | A | * | 1/1874 | Mersereau | 119/856 |
|---|---|---|---|---|---|
| 1,614,083 | A | | 1/1927 | Plantico | |
| 1,800,421 | A | * | 4/1931 | Wickersham et al. | 119/863 |
| 1,906,043 | A | | 4/1933 | Bernstein | |
| 2,233,397 | A | | 3/1941 | Bloom | |
| 2,798,458 | A | * | 7/1957 | Odermatt | 119/858 |
| 3,768,445 | A | * | 10/1973 | Sorrels | 119/856 |
| 3,769,939 | A | * | 11/1973 | Wais et al. | 119/856 |
| 4,060,056 | A | | 11/1977 | Maietta | |
| 4,091,766 | A | * | 5/1978 | Colliard | 359/518 |
| 4,174,553 | A | * | 11/1979 | Schrougham et al. | 24/321 |
| 4,559,906 | A | * | 12/1985 | Smith | 119/865 |
| 4,917,049 | A | | 4/1990 | Peterson | |

(List continued on next page.)

FOREIGN PATENT DOCUMENTS

| DE | 3837507 A1 | * | 1/1990 | .......... A01K/27/00 |
|---|---|---|---|---|
| EP | 0555588 A2 | * | 12/1992 | .......... A01K/27/00 |

OTHER PUBLICATIONS

Internet Article Delta Society, http://www.deltasociety.org/stardards/section32.html.
Internet Picture, The Newfoundland Anatomy.

(List continued on next page.)

*Primary Examiner*—Peter M. Poon
*Assistant Examiner*—Andrea M. Valenti

(57) ABSTRACT

A non-choking collar that encompasses an animal's shoulders, thereby preventing neck, forechest, and airway injuries associated with many animal restraints. The animal shoulder collar with separation controlled hook-and-loop closure involves a length of material with opposing ends, a pair of leg openings and a hook-and-loop closure with a D-ring through the hook-and-loop that prevents separation of the hook and loop when used for restraint. Utilization of the shoulder collar involves placing the animal's front legs through the leg openings, and wrapping the opposing ends of the collar around both sides of the animal without involving the neck or forechest, and placing the opposing ends of the collar on top of the animal's shoulders where the hook fastener is placed on top of the loop fastener that is attached to a D-ring tab with a D-ring, such that the D-ring tab and the D-ring are protruding through an opening in the hook fastener. When attached to a leash, the D-ring through the hook-and-loop fastener prevents unwanted separation of the hook-and-loop fastener. When a leash is not attached to the D-ring, the hook-and-loop fastener will pull apart easily for quick removal by the owner or as a safety feature. The non-choking separation controlled shoulder collar is exceptionally easy to install and remove and is suitable for restraining all four-legged animals. An alternative human related use of the separation controlled hook-and-loop closure includes a fail safe hook and loop closure that will not pull apart unexpectedly when attached to an external restraint tether for use with exercise, or medical therapy equipment, or other devices that require a tether.

2 Claims, 6 Drawing Sheets

U.S. PATENT DOCUMENTS

Figure 1:
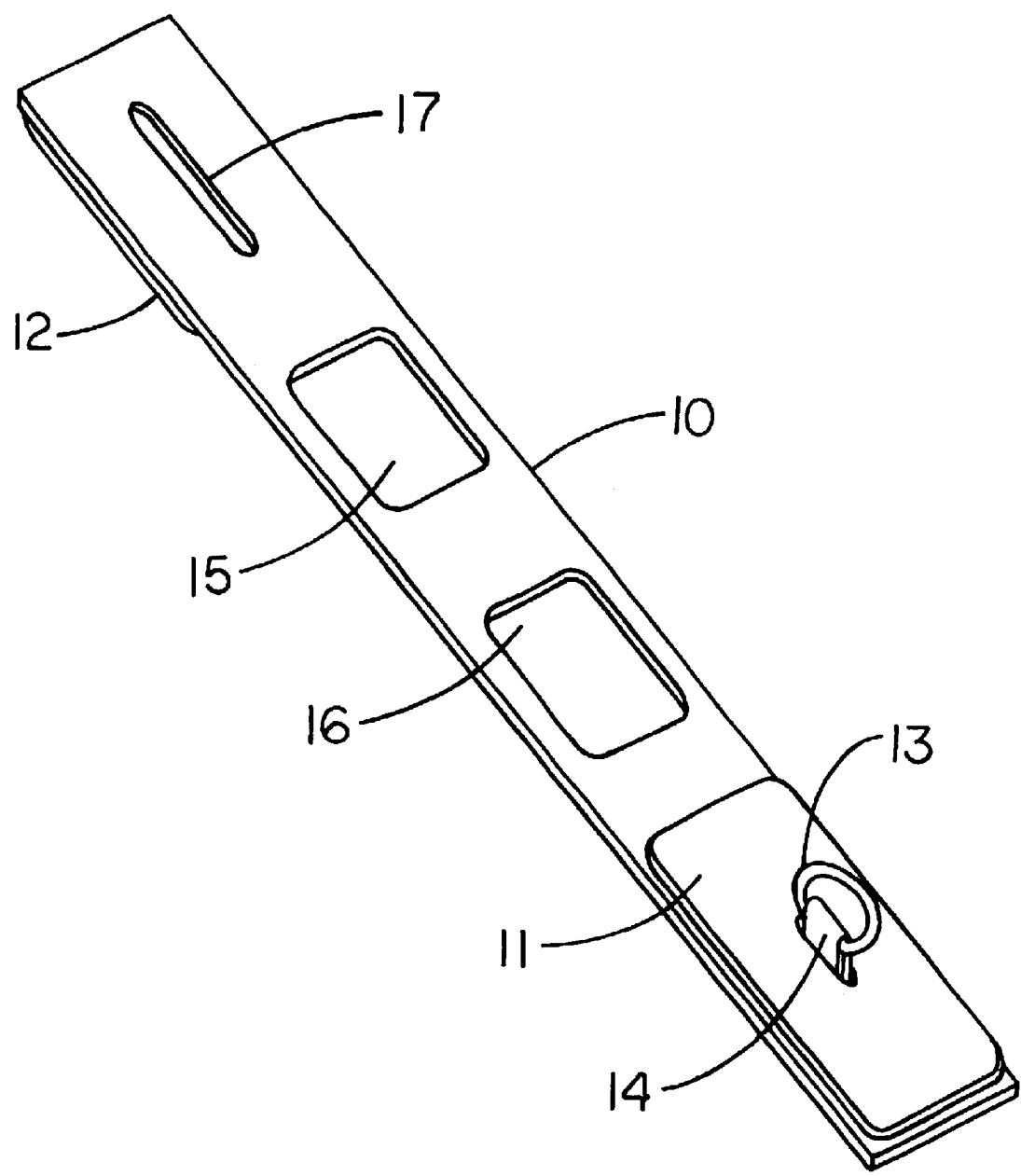

| | | | | | |
|---|---|---|---|---|---|
| 4,924,815 | A | * | 5/1990 | Halla | 119/864 |
| 4,964,369 | A | | 10/1990 | Sporn | |
| 5,031,576 | A | * | 7/1991 | Weinberg | 119/865 |
| 5,050,538 | A | | 9/1991 | Gurski, Jr. | |
| 5,335,627 | A | | 8/1994 | Bandimere | |
| 5,383,426 | A | | 1/1995 | Krauss | |
| 5,471,953 | A | | 12/1995 | Sporn | |
| 5,647,303 | A | * | 7/1997 | Deioma | 119/864 |
| 5,682,840 | A | * | 11/1997 | McFarland | 119/856 |
| 5,785,011 | A | * | 7/1998 | Gitterman, III | 119/865 |
| 6,308,663 | B1 | * | 10/2001 | Philen et al. | 119/864 |
| 6,422,177 | B1 | * | 7/2002 | Noguero | 119/856 |
| 6,449,815 | B1 | * | 9/2002 | Spiller | 24/306 |

OTHER PUBLICATIONS

Dog Neck and Skeletal injuries, http://www.larzequipment.com/neck–injuries.html.

Dog Walking Harness, http://www.pettails.com/dogwalhar.html.

Assistance Dog Harness, Therapy Dog Harness, No–Pull Harness—Website: FuturePets.com.

Small Pet Harness—Website: Petdiscounters.com.

Rope–N–Go Harness—http://www.rope–n–go.com/testimonials.htm.

* cited by examiner

NON-CHOKING ANIMAL SHOULDER COLLAR WITH SEPARATION CONTROLLED HOOK AND LOOP CLOSURE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to animal restraint devices such as collars and harnesses and more specifically to non-choking animal restraint devices.

BACKGROUND OF THE INVENTION— DISCUSSION OF PRIOR ART

Animals are commonly restrained by way of attaching a leash to a flat collar, choke chain, slip, limited slip, or prong type collar that encircles the animal's neck. Animals are also restrained by way of attaching a leash to a harness that encircles the animal's neck and body behind the front legs, or to a halter that encircles the animal's muzzle, head and neck. More recently, animals are restrained by way of attaching a leash to a no-pull type harness that encircles the animal's neck and puts pressure against the animal's sensitive foreleg pits. Many of the devices that are commonly used to restrain animals consist of an array of complicated straps and buckles that have to be attached in various places including underneath the animal.

While flat collars, choke collars, harnesses and halters that are currently widely used have been the main methods of restraining animals for many years, they have not proven to be entirely satisfactory. These devices typically result in pressure on the animal's neck, forechest, and airway and cause choking or pinching when the animal is attached to a leash. The forechest is described as the area across the front of the animal between the neck and chest. The chest is described as the underside area between the animal's front legs. Many harnesses encircle the animal's neck and have straps that go across the front of the animal below the neck and between the shoulders, also known as the forechest, and put pressure on the animal's airway.

Many animals that wear harnesses with straps across the forechest have trouble breathing when they pull against a restraint leash and they experience choking and wheezing. Many times, animal owners do not realize that their animal's neck collars or harnesses are causing injury. Animal owners do not recognize that coughing is a sign of choking when the animal is pulling against a collar or harness. Some of the harnesses claim that the pulling forces are distributed evenly across the neck and forechest area, but many animals are still unable to breathe and experience serious injury when restrained with a harness across the forechest. On occasion, animals experience serious injury when their neck collars are accidentally caught on something and their airways are restricted. The non-choking, no-pull type harnesses that are currently used as restraint devices put pressure on the animal's foreleg pits and have not proven to be satisfactory as these devices can cause undesired pain.

Currently, many commonly used animal restraint devices incorporate a choke collar feature. Many of the restraints that incorporate choking in order to control the animal were developed without the inventors realizing that putting pressure on the animal's airway was actually causing injury. Restraints that put pressure on the animal's airway often result in choking and are not effective until the animal is out of breath. The animal will continue to pull against the collar or harness even though the pulling is painful in the area of the neck or forechest. The animal will not stop pulling and will endure the pain until the animal loses its breath. Continued use of collars that cause pain can result in animals that become fearful and aggressive. Choke collars that put pressure on the animal's neck, forechest and airway, and cut off the animal's wind or cause repeated neck injury could be considered cruel and inhumane. Animal restraint devices that cause choking and unnecessary pain should be replaced.

Restraint devices, such as harnesses, involve a complicated array of straps and have not proven to be satisfactory as they are difficult to install. Generally, hook-and-loop fasteners are not used to attach restraint devices to animals because hook-and-loop can easily separate when a pulling action is exerted against the hook-and-loop fastener. Very often, if a hook-and-loop fastener is used for restraint it is placed through the center section of a metal ring and wrapped around the opposing section of hook-and-loop; however, when a tether is attached to the ring, the constant pulling forces against the hook-and-loop eventually cause the hook-and-loop to unwrap and become unattached and the item being restrained breaks free. Many animal collars that use hook-and-loop also use multiple rings to prevent the separation that occurs when a pulling action is exerted against the hook-and-loop fastener.

Research indicates that very few attempts have been made to restrain animals by devices other than those listed above where the restraint device encircles the neck or has straps across the forechest. Even though harnesses generally encircle the animal's body behind the front legs, they also encircle the neck or forechest. While some harnesses involve restraining the animal's front legs, there have been no attempts to restrain animals by avoiding pressure on both the neck and forechest.

A novel form of dog harness that includes a choke collar is described in U.S. Pat. No. 1,614,083 to Plantico (1927). According to this patent, when a dog pulls upon the harness against the lead strap, his wind is gradually cut off and he is forced to obey. This harness involves various complicated straps and buckles and it cuts off the animal's wind.

A harness that consists of a body strap with a buckle that fits around the body of an animal behind its forelegs, and a collar strap that rests on the shoulders of the animal is described in U.S. Pat. No. 1,906,043 to Bernstein (1933). This patent states that when strain is placed on a leash, it is applied to the animal's shoulders through a collar strap. When the animal is restrained with this device, there are various straps and buckles that have to be placed through loops and secured underneath the animal's chest and on the side of the animal. The termination point of the elongated loop portion of the collar strap is positioned across the animal's forechest.

An object of the invention described in U.S. Pat. No. 2,233,397 to Bloom (1941) is to provide a dog harness definitely avoiding a choking effect on throat, undue pressure on throat muscles, cords, and nerves effecting the lungs and heart, particularly when a dog strains against a leash attached to the harness. This harness is positioned across the dog's forechest.

A description of a harness that causes an animal to be restrained by forces exerted on the chest as opposed to windpipe choking forces is contained in U.S. Pat. No. 4,060,056 to Maietta (1977). This invention's objective is to provide an animal restraining apparatus that applies restraining forces to an area below the frontmost portion of the neck. This leash and harness assembly consists of unitary construction. It involves placing the straps behind the forelegs underneath the animal, around the lower neck area, and inserting them through openings.

More recently, another effort is being made to restrain animals without producing a choking action. U.S. Pat. No. 4,964,369 to Sporn (1990) describes a leash attachable dog harness that includes a pair of restraint cables that impose a pressure on the highly sensitive foreleg pits in order to restrain a dog without producing a choking action. The patent goes on to indicate that the harness comprises a collar that encircles the dog's neck along with restraint cables that are hooked to the collar. U.S. Pat. No. 5,335,627 to Bandimere (1994) talks about U.S. Pat. No. 4,964,369 to Sporn (1990) and describes that the Sporn restraint cables impose a painful pressure in the foreleg pits. The Bandimere harness comprises a collar that encircles the dog's neck along with restraint straps around the legs. U.S. Pat. No. 5,471,953 to Sporn (1995) describes a similar harness that is modified whereby no neck collar must be fitted to the neck of the dog, but rather, it incorporates a chest junction that is positioned across the dog's forechest and a pair of restraint cables.

A non-choking strain reducing dog harness with a neck collar that has a cord that forms a pair of loops for disposition in the foreleg pits is described in U.S. Pat. No. 5,383,426 to Krauss (1995). This patent involves a neck collar that encircles the animal's neck and states that its principal objective is to improve upon the prior non-choking devices.

A safety releasable neck collar for animals that combines a safety collar, conventional collar, and a choke collar is described in U.S. Pat. No. 4,917,049 to Peterson (1990). The collar encircles the neck and utilizes both a hook-and-loop fastener and rings for closure.

A description of a breakaway pet collar with hook-and-loop fastener that allows an animal wearing the collar to escape is contained in U.S. Pat. No. 5,050,538 to Gurski (1991). The object of this invention is to provide a flat neck collar that involves two fastening methods with the use of a hook-and-loop fastener and two D-rings. When fastened only with hook-and-loop fastener, the collar pulls apart to allow the animal to free itself if caught accidentally. When fastened with two D-rings, the collar encircles the neck and allows the animal to be held securely on a leash or rope.

Even though there have been several attempts to restrain animals without cutting off their wind, the main focus of those who have made an effort to restrain animals without choking has been to put pressure on the sensitive foreleg pits and cause pain. Devices that encircle the neck or forechest and put pressure on the foreleg pits to restrain an animal still put pressure on the neck, forechest and airway. This restraining method can be considered cruel and it causes undesired pain to be inflicted upon the animal for control purposes. Harnesses and flat collars that encircle the neck, lower neck, or forechest put pressure on the animal's airway and can cause pain and injury when used for restraint. Complicated harnesses that put pressure on the animal's neck, forechest, and cut off the animal's wind or cause repeated neck injury can be considered inhumane and could cause the animal to become fearful and aggressive. Flat collars that put pressure on the animal's neck and airway can cause choking and neck injury and should be replaced with non-choking restraint devices. Animal restraint devices that cause unnecessary pain should be replaced with new and improved restraint devices that do not choke or cause pain when the animal is controlled by a leash.

Animal harnesses are generally cumbersome and difficult to put-on and take-off of an animal. They involve various complicated straps and buckles and are difficult to position on the animal. Generally, animal collars and harnesses do not use hook-and-loop fasteners as a quick and easy method of closure because hook-and-loop fasteners will separate when pulled against with force. When multiple rings are used in addition to hook-and-loop fastener, there is a possibility that inadvertent failure to connect both rings would not be immediately evident and the animal could break free. While the hook-and-loop fastening method allows the collar to come apart easily, the use of multiple D-rings could result in unintentional release of the animal. If one of the rings is accidentally missed and both rings are not simultaneously attached to a leash, the animal could unexpectedly break free. Restraint devices that utilize hook-and-loop fastener along with multiple D-rings to insure restraint should be improved and simplified. It would be desirable to have easily installed harnesses and collars that have quick and uncomplicated closures that will not separate unintentionally when used for restraint.

All of the animal restraint devices heretofore known suffer from a number of disadvantages:
  (a) they can cause undesired pain and injury by putting pressure on an animal's neck, forechest, airway, or foreleg pits when the animal is pulling against a restraint leash; and
  (b) they are cumbersome, time consuming, and difficult to put-on and take-off since they have an array of straps and buckles and involve hard to reach areas of the animal; and
  (c) they can result in the animal accidentally breaking free if care is not taken during installation of collars with hook-and-loop fasteners and multiple rings; and
  (d) they involve straps, webbing, or banding, and are limited to the types of material that can be used for manufacturing; and
  (e) they can result in neck injuries that animal owners do not realize can be produced by collars or harnesses; and
  (f) they can result in cost to animal owners for medical treatment due to unanticipated neck injuries; and
  (g) they are often complicated and made with multiple pieces.

BACKGROUND OF INVENTION—OBJECTS AND ADVANTAGES

Accordingly, several objects and advantages of the present invention are:
  (a) to provide a non-choking restraint that does not put pressure on the neck, forechest, airway, or foreleg pits of an animal when pulling against a restraint leash; and
  (b) to provide a restraint that has a quick, uncomplicated method of closure that is simple to put-on and take-off of an animal; and
  (c) to provide an animal restraint that will be easily attached to a leash without the possibility of accidentally failing to connect all of the rings; and (d) to provide an animal restraint that can be manufactured from a variety of materials; and (e) to provide a restraint that will not touch the animal's neck or forechest or result in unanticipated coughing, choking, or neck injuries; and (f) to provide a restraint that will eliminate the potential medical costs associated with unanticipated harness or neck collar injuries; and (g) to provide a restraint that involves one piece construction and is easy and economical to manufacture.

Further objects and advantages are to provide an animal restraint that improves upon some of the best features of conventional collars and harnesses. The shoulder collar utilizes a simplistic circular band to encompass the animal's legs and shoulders. The band also encircles the area behind the animal's forelegs and incorporates a ring for attachment to a leash. The shoulder collar eliminates the need to encircle the neck or forechest in order to restrain the animal while still providing the necessary restraint. An additional improvement of the collar is the method of attachment that provides a safety release feature and quick and easy removal. Improvements also include a restraint that will be inexpensive to manufacture from a variety of materials in a variety of sizes to fit any four-legged animal. Additional advantages include utilizing a secure hook-and-loop closure that will not separate unintentionally when used for restraint purposes. Still further objects and advantages will become apparent from a consideration of the ensuing description and drawings.

SUMMARY

The present invention comprises a selective quick release animal restraint device that is easily installed around the legs and shoulders and does not put pressure on an animal's neck, forechest or airway.

DRAWINGS—FIGURES

FIG. 1: Open shoulder collar.

Figure 2:
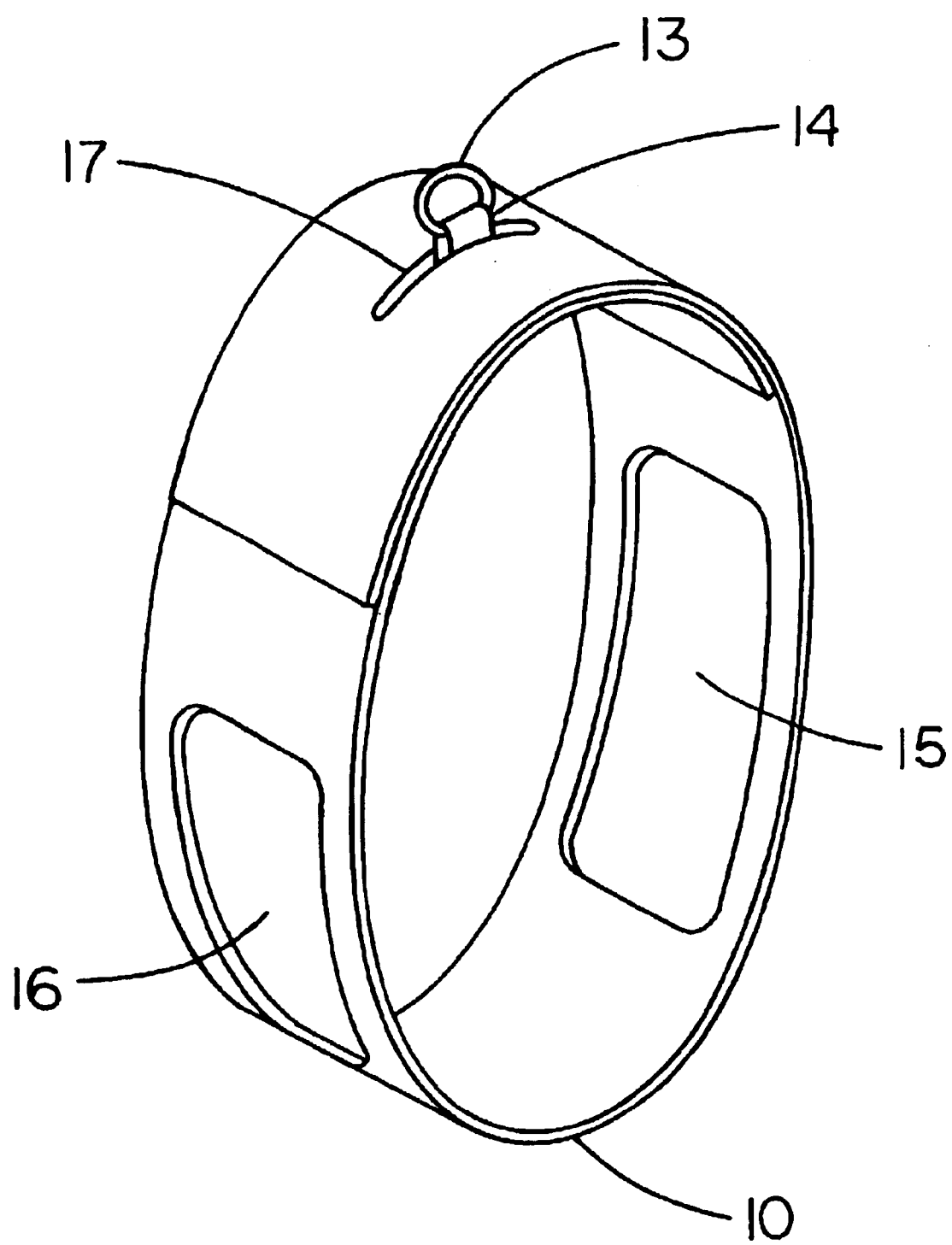

FIG. 2: Closed shoulder collar.

Figure 3:
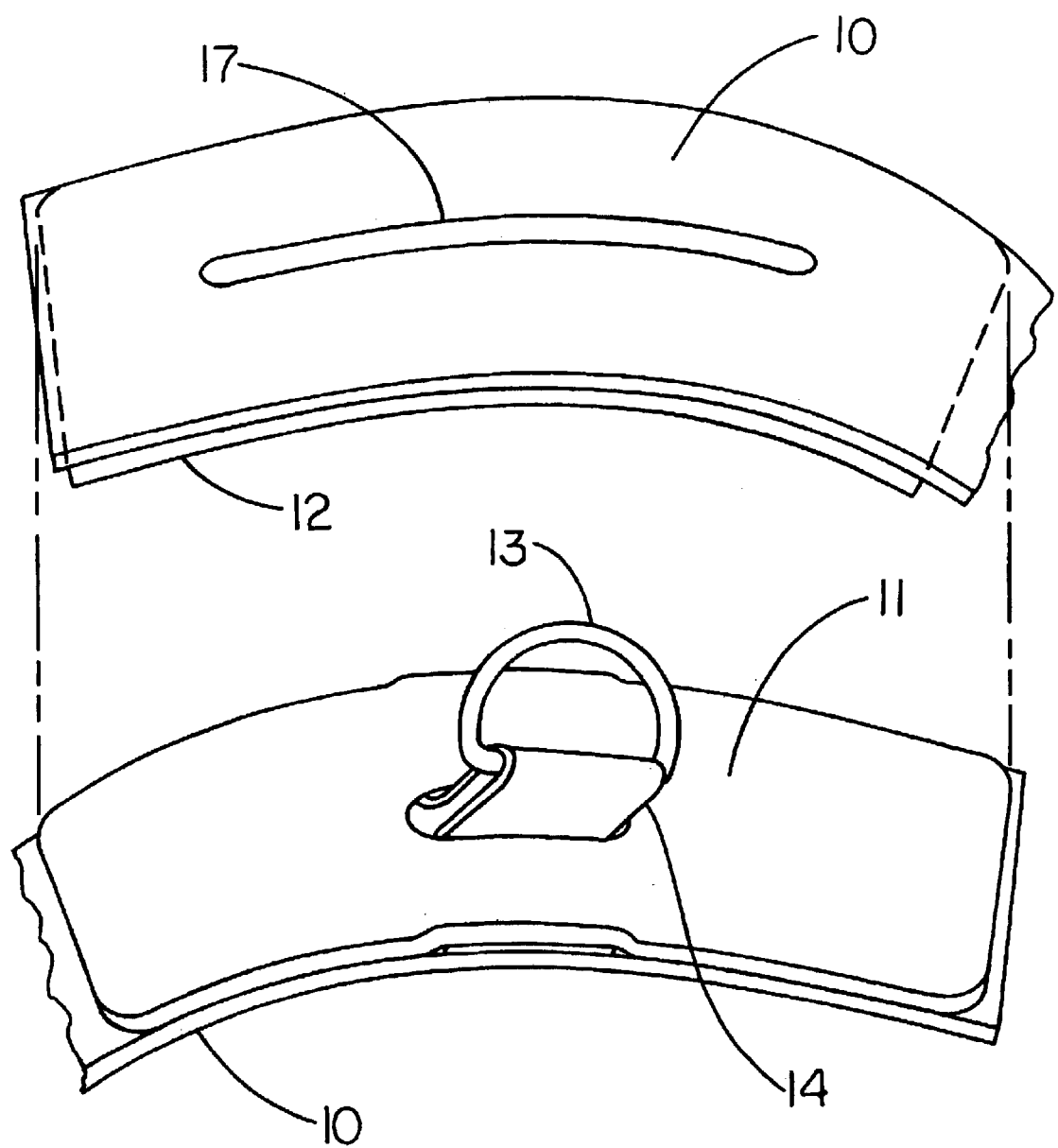

FIG. 3: Exploded view depicting the controlled separation hook-and-loop closure.

Figure 4:
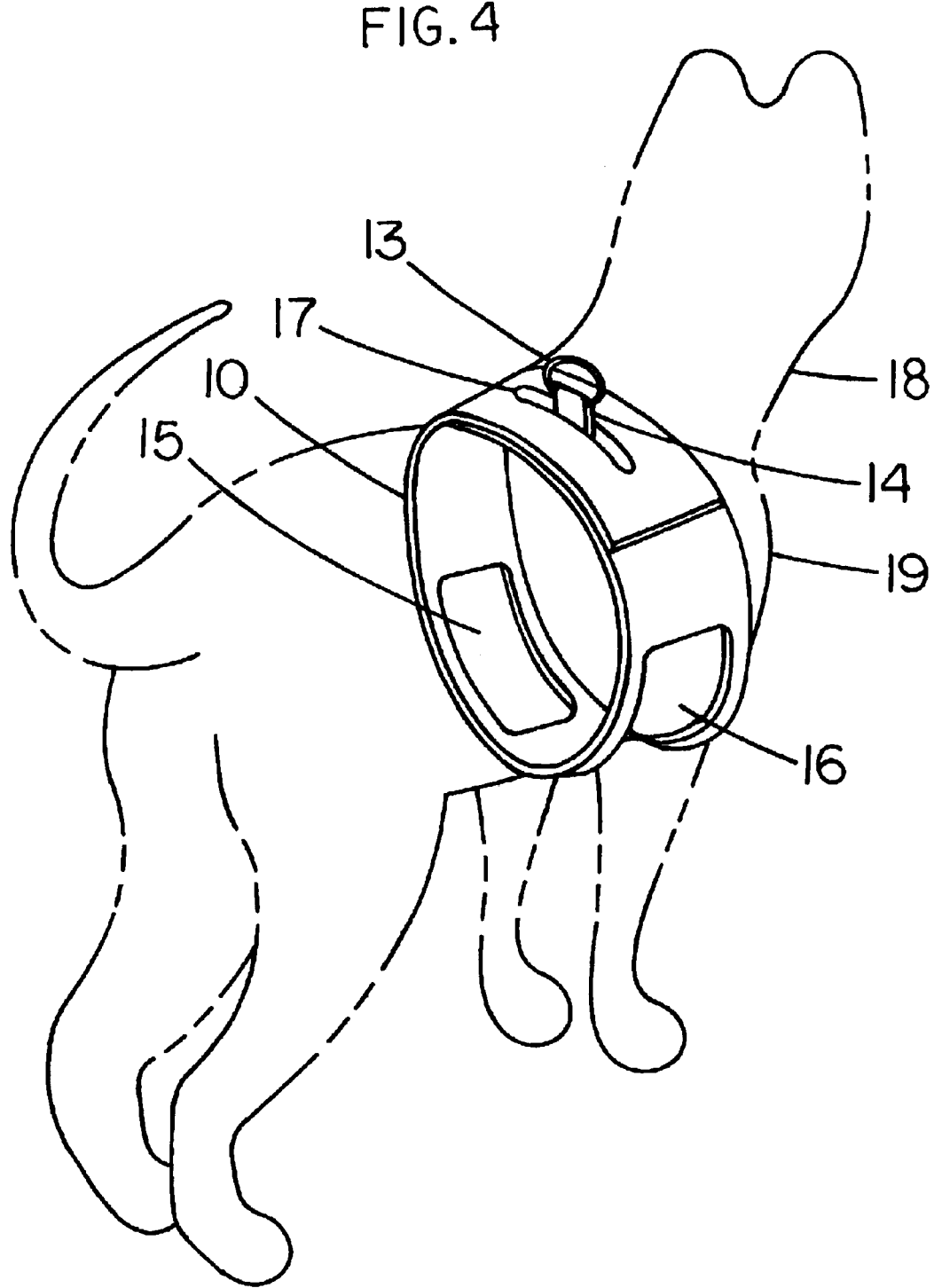

FIG. 4: Animal wearing shoulder collar with separation controlled hook-and-loop closure.

Figure 5:
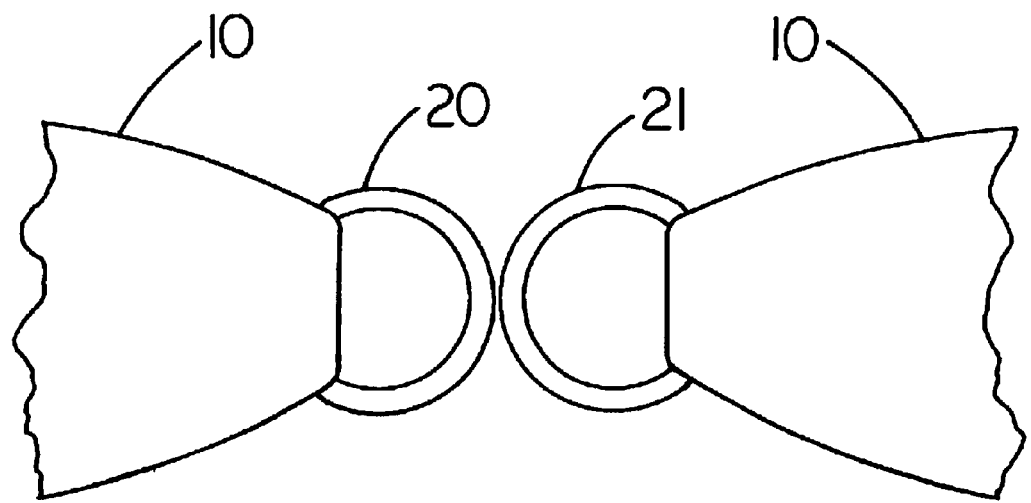

FIG. 5: Collar closure with two D-rings.

Figure 6:
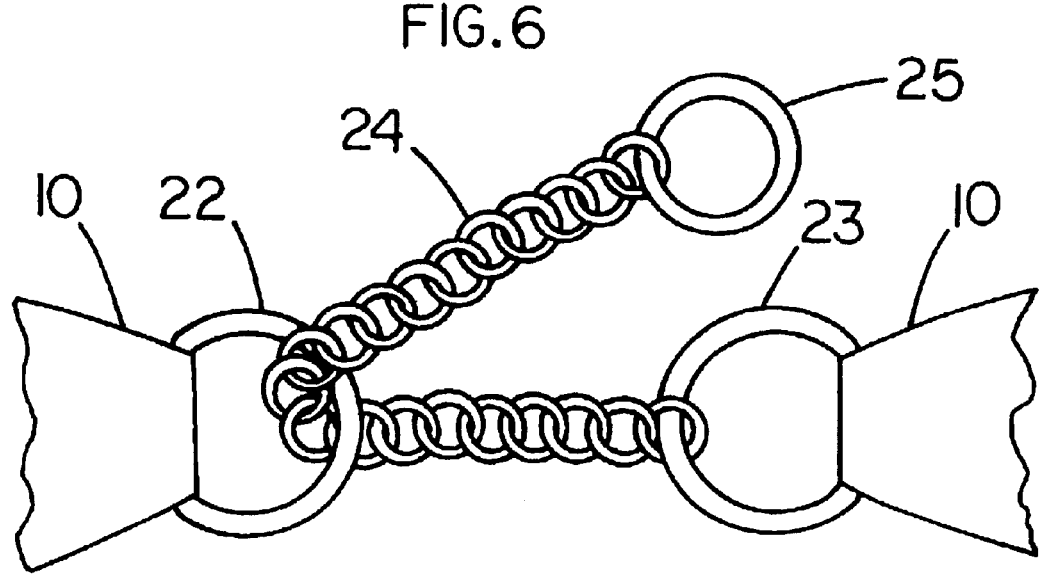

FIG. 6: Collar closure with ring and chain.

Figure 7:
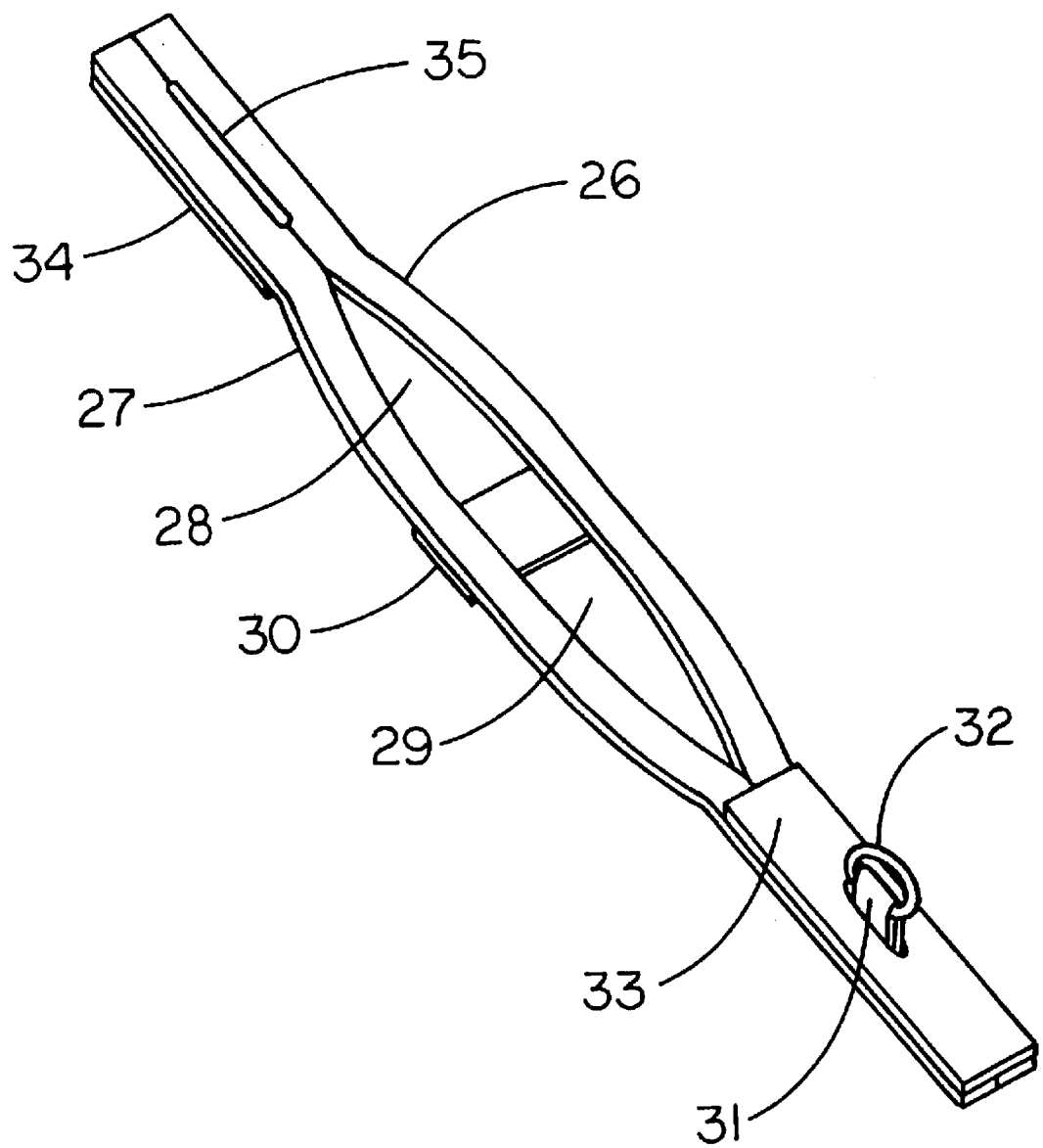

FIG. 7: Nylon webbing shoulder collar with separation controlled hook-and-loop closure.

DRAWINGS—REFERENCE NUMERALS

| | |
|---|---|
| 10 | material |
| 11 | loop fastener |
| 12 | hook fastener |
| 13 | D-ring |
| 14 | D-ring tab |
| 15 | leg opening |
| 16 | leg opening |
| 17 | D-ring opening |
| 18 | neck |
| 19 | forechest |
| 20 | D-ring |
| 21 | D-ring |
| 22 | D-ring |
| 23 | D-ring |
| 24 | chain |
| 25 | ring |
| 26 | nylon webbing |
| 27 | nylon webbing |
| 28 | leg opening |
| 29 | leg opening |
| 30 | center section |
| 31 | D-ring tab |
| 32 | D-ring |
| 33 | loop fastener |
| 34 | hook fastener |
| 35 | D-ring opening |

A preferred embodiment of the animal shoulder collar with controlled separation hook-and-loop closure of the present invention is illustrated in FIG. 1—open shoulder collar, FIG. 2—closed shoulder collar, FIG. 3—exploded view depicting the controlled separation hook-and-loop closure, and FIG. 4—animal wearing shoulder collar with separation controlled hook-and-loop closure.

FIG. 1 shows a perspective view of an open shoulder collar. This view shows the main body of the collar that is composed of a length of material 10 with a pair of leg openings 15, 16; a D-ring tab 14 with a D-ring 13 that is attached to topside of material 10; a loop fastener 11 that is attached over top of D-ring tab 14 to material 10; a hook fastener 12 that is attached to the underside of material 10 with D-ring opening 17 through both material 10 and hook fastener 12.

FIG. 2 shows a closed collar secured with hook-and-loop, wherein material 10 with a pair of leg openings 15, 16 is overlapped with hook-and-loop engaged, and a D-ring 13 that is attached to a D-ring tab 14 protrudes through D-ring opening 17.

FIG. 3 shows an exploded view containing both pieces of a separation controlled hook-and-loop closure. The upper view of FIG. 3 shows the top piece of the separation controlled hook-and-loop closure that involves material 10, whereto hook fastener 12 is attached to the underside of one end of material 10 with D-ring opening 17 through both material 10 and hook fastener 12. The lower view of FIG. 3 shows the bottom piece of the separation controlled hook-and-loop closure that involves the opposite end of material 10, whereto D-ring tab 14 with D-ring 13 is attached to topside of material 10 and loop fastener 11 is attached over top of D-ring tab 14 to material 10.

FIG. 4 shows a side view of an animal wearing a shoulder collar with a separation controlled hook-and-loop closure with hook-and-loop engaged. A length of material 10 with leg openings 15, 16 wraps around the animal without contacting neck 18 or forechest 19 and is secured together at the top of the shoulders with D-ring tab 14, and D-ring 13 protruding through D-ring opening 17.

Operation—FIGS. 1, 2, 3, and 4—Preferred Embodiment

The manner of using the preferred embodiment of an animal shoulder collar with separation controlled hook-and-loop closure is shown in FIGS. 1, 2, 3, 4 and involves placing the animal's front legs through FIG. 4 leg openings 15, 16, and wrapping the opposing ends of material 10 around both sides of the animal without involving neck 18 or forechest 19; whereby, material 10 and FIG. 3 loop fastener 11, with D-ring tab 14, and D-ring 13 are placed on top of the animal's shoulders. Material 10 and hook fastener 12 are placed on top of loop fastener 11 that is attached to material 10 and D-ring tab 14 with D-ring 13, such that FIG.

4 D-ring tab 14 and D-ring 13 are protruding through D-ring opening 17. When a leash is attached to D-ring 13, the animal can be restrained as needed without fear of the FIG. 3 hook fastener 12 and loop fastener 11 pulling apart. In the event a leash is not attached to FIG. 4 D-ring 13, FIG. 3 hook fastener 12 and loop fastener 11 will pull apart easily for quick removal by the owner or as a safety feature. In summary, the animal shoulder collar can be quickly installed by placing the animals front legs through FIG. 4 leg openings 15, 16, wrapping material 10 around the animal's shoulders, and placing FIG. 3 opposing hook fastener 12 and loop fastener 11 together while exposing the FIG. 4 protruding D-ring 13. When a leash is attached to the D-ring, the animal can be restrained as needed without fear of choking or injury to the neck, forechest, or airway, or unintentional release of the hook-and-loop closure.

Alternative Embodiments

As a result of the above changes, the specification will now clearly and completely teach how to make and use the applicant's invention.

An additional alternative embodiment of an animal shoulder collar is to use the same type of collar to encircle the animal's rear legs. A rear leg collar is a device that could be used to assist animals with rear leg and hip problems. The owner can attach an external control leash and lift the animal's rear legs in order to provide assistance to the animal.

An additional alternative embodiment, that involves human use of the separation controlled hook-and-loop closure, entails using the hook-and-loop with D-ring through opening type closure with exercise or medical therapy equipment, or other devices that require a tether. The upper view of FIG. 3 shows the top piece of the separation controlled hook-and-loop closure that involves one end of material 10, whereto hook fastener 12 is attached to the underside of material 10 with D-ring opening 17 through both material 10 and hook fastener 12. The lower view of FIG. 3 shows the bottom piece of the separation controlled hook-and-loop closure that involves the opposite end of material 10, whereto D-ring tab 14 with D-ring 13 is attached to topside of material 10 and of loop fastener 11 is attached over top of D-ring tab 14 to material 10. In summary, the alternative use of the separation controlled hook-and-loop closure with D-ring as depicted in FIG. 3 provides a fail safe hook and pile closure that will not pull apart unexpectedly when attached to an external restraint tether for use with exercise or medical therapy equipment, or other devices that require a tether.

Conclusion, Ramifications, and Scope of Invention

Based on the details provided herein, the reader can readily see that the non-choking animal shoulder collar with controlled separation closure is a very useful product that can be used to restrain all four-legged animals including dogs, cats, guinea pigs, and other animals. Since this collar restrains an animal by encircling the shoulders and legs, it is totally different than any other restraint device previously available. If the animal pulls against a leash when it is restrained with the shoulder collar, no force can cause pain or injury to the neck or forechest area. The force is distributed to the largest area of the animal's body. The entirely unique separation controlled hook-and-loop closure of the animal shoulder collar greatly improves upon the use of hook-and-loop fasteners for use with animal collars. The simplicity of the shoulder collar, with a pair of leg openings and the hook-and-loop closure, make it very easy for anyone, including children, to install and use the collar. The hook-and-loop fastener can also be used for other restraint devices without fear of separation when pulling forces are exerted.

While the above description contains many specific characteristics and details, these should not be construed as limitations on the scope of the invention, but rather as an exemplification of one preferred embodiment thereof. For example, D-rings are not the only hardware that could be used to secure the collar or leash, but were merely selected as the most convenient in the examples given herein. Additional possibilities include the sizing of the non-choking animal collar to function appropriately for all breeds, shapes, varieties and sizes of four legged animals. An indefinite number of collars of different sizes and colors could be produced. There are many possible shapes that include elliptical, oblong, rectangular, scalloped, varied widths, or other shapes. All types of closures including buckles, quick release features or any other alternate could be incorporated. The closure locations could be placed on the sides, bottom, or other areas. Materials including vinyl, leather, woven nylon, strapping, canvas, elastic, cloth, fabric or others could be selected to make the shoulder collar. Combinations of the above materials or others could be used. Size adjustments could be made possible in various locations of the collar by incorporation of buckles or other size adjustment methods. Hook-and-loop used herein can mean any suitable hook-and-loop fastening material. The dimensions of all aspects of the shoulder collar, the material, the hook-and-loop and the attached hardware, are all variable, depending upon preference, the size of the shoulder collar, and the size and strength of the animal it is meant to fit.

Accordingly, the scope of the invention should be determined not by the embodiments illustrated, but by the appended claims and their legal equivalents.

What is claimed is:

1. A shoulder collar for restraining an animal, comprising:

(a) a singular and continuous predetermined elongated material having a first end and a second end, and a topside, and a bottom side, and (b) a pair of leg openings appropriately sized for an animal's legs located through said material and in between said first end and said second end of said material, and (c) a means for fastening said first end and said second end of said material with said leg openings together, and (d) a means for attachment of said material with said leg openings to an external tethering device, and (e) said means for attachment includes an external tether affixed to said top side of said first end of said material, and (f) said means for fastening includes a predetermined loop side of hook-and-loop fastening fabric affixed to the top side of said first end of said material, and (g) said means for fastening includes a predetermined hook side of hook-and-loop fastening fabric affixed to said bottom side of said second end of said material, and (h) said means for fastening includes an opening appropriately sized and located within said second end of said material and said affixed hook side of hook-and-loop fastening fabric, whereby (i) the means for attachment of an external tether affixed to said top side of said first end of said material and said predetermined hook side of hook-and-loop fastening fabric will protrude through said opening appropriately sized and located within said second end of said material and said affixed hook side of hook-and-loop fastening fabric such that when said top side of said first end of said material and said bottom side of said second end of said material are placed together and said means for attachment to an external tether is attached to an external tether, said hook-and-loop fastening fabric can be used for closure during restraint without accidentally pulling apart, and the animal can be restrained without pressure against its neck, forechest or airway.

2. A method of controlling the separation of hook-and-loop fastening fabric when utilized for restraint against pulling forces, comprising:

(a) providing a singular and continuous predetermined elongated material having a first end and a second end, and a topside, and a bottom side, and (b) providing a pair of leg openings appropriately sized for an animal's legs located through said material and in between said first end and said second end of said material, and (c) providing a means for fastening said first end and said second end of said material with said leg openings together, and (d) providing a means for attachment of said material with said leg openings to an external tethering device, and (e) affixing a device for attachment of an external tether to a top side of a first end of said material, and (f) affixing a predetermined loop side of hook-and-loop fastening fabric to said top side of said first end of said material, and (g) affixing a predetermined hook side of hook-and-loop fastening fabric to a bottom side of a second end of said material, and (h) placing an appropriately sized and located opening through said second end of said material and said hook side of hook-and-loop fastening fabric, and (i) positioning said device for attachment of said external tether that is affixed to said first end of said material and said loop side of hook-and-loop fastening fabric through said opening in said loop side of hook-and-loop fastening fabric through said opening n said second end of said material and said hook side of hook-and-loop fastening fabric, and (j) joining together said hook side of hook-and-loop fastening fabric and said loop side of hook-and-loop fastening fabric, and (k) attaching an external tether to said device for attachment that is affixed to said material; whereby said hook-and-loop fastening will remain joined together when used for restraint against pulling forces, and an animal can be restrained without pressure against its neck, forechest or airway.

* * * * *